United States Patent [19]
Medworth

[11] Patent Number: 5,976,370
[45] Date of Patent: Nov. 2, 1999

[54] UNDERDRAIN STRUCTURE FOR MEDIA FILTERS

[75] Inventor: Graeme Medworth, Salt Lake City, Utah

[73] Assignee: Westech Engineering, Inc., Salt Lake City, Utah

[21] Appl. No.: 08/888,476

[22] Filed: Jul. 7, 1997

[51] Int. Cl.[6] .................................................. B01D 24/42
[52] U.S. Cl. .......................................... 210/289; 210/291
[58] Field of Search .................................. 210/289, 291, 210/293

[56] References Cited

U.S. PATENT DOCUMENTS

| | | | |
|---|---|---|---|
| 989,665 | 4/1911 | Tixier | 210/291 |
| 3,994,812 | 11/1976 | Nilsson | 210/289 |
| 4,851,112 | 7/1989 | Schlensker | 210/291 |
| 5,030,343 | 7/1991 | Urriola | 210/293 |
| 5,332,497 | 7/1994 | Shea et al. | 210/289 |

*Primary Examiner*—Ivars Cintins
*Attorney, Agent, or Firm*—Shook, Hardy & Bacon LLP

[57] ABSTRACT

An underdrain for a media filter used to filter liquids. The media particles rest on a pair of perforated plates having offset perforations. The plates are spaced apart a distance less than the size of the media particles. This allows the filtered liquid to flow through the plates but blocks passage of the media particles through the plates.

19 Claims, 3 Drawing Sheets

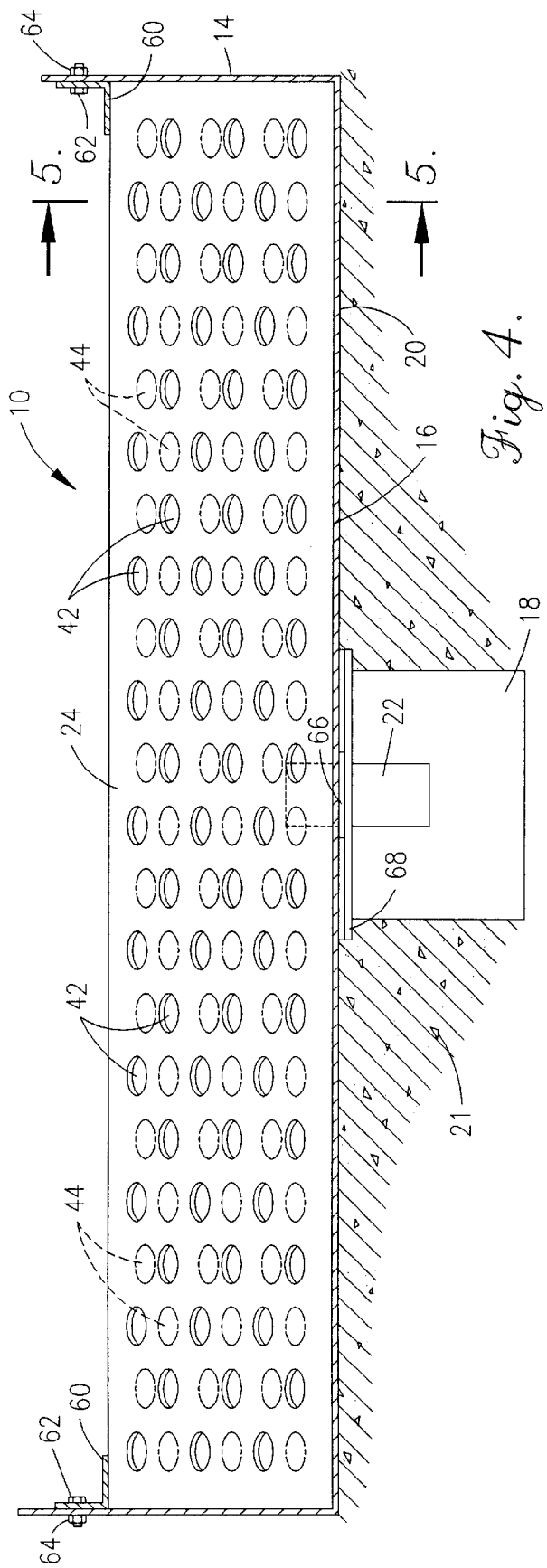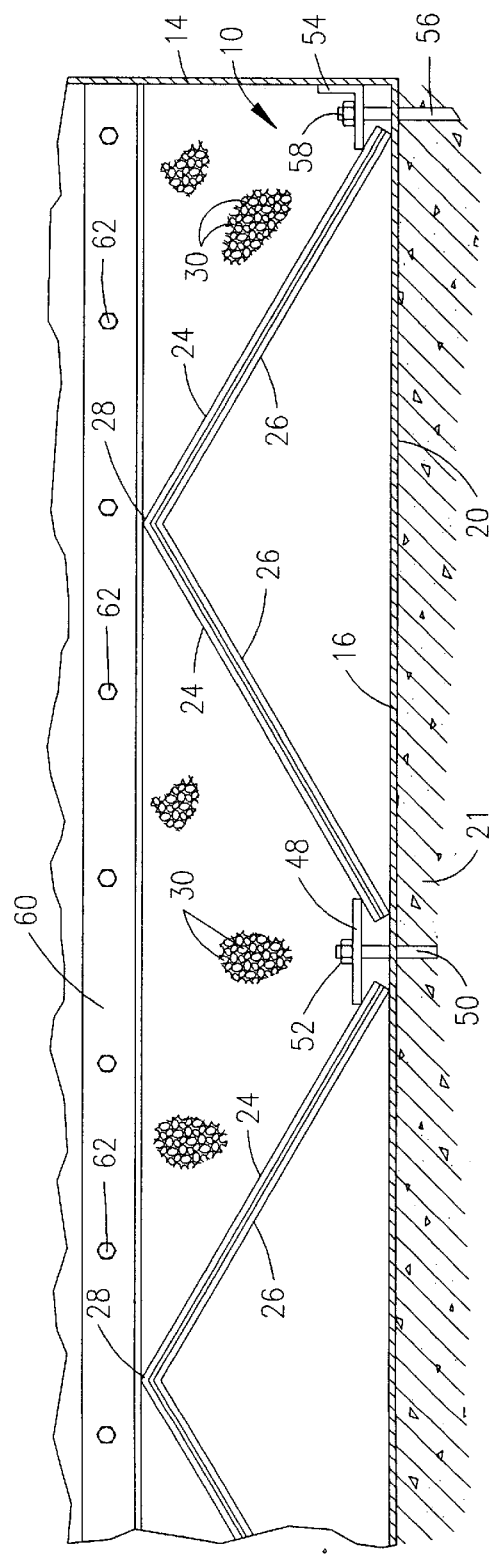

UNDERDRAIN STRUCTURE FOR MEDIA FILTERS

FIELD OF THE INVENTION

This invention relates generally to the treatment of water and more particularly to an improved underdrain media filter of the type commonly used to filter impurities from water and other liquids.

BACKGROUND OF THE INVENTION

In the treatment of water, wastewater and other liquids, filters of various types are commonly used to filter out solid particles. Media filters often make use of filter media formed by a mixture of fine sand and anthracite. The liquid passes through the filter media in order to remove some of the impurities.

The drain system for this type of filter must be constructed to allow the filtered liquid to drain away while avoiding carrying away the media particles with the liquid. The particles typically have a size of about 0.020 inch or even less, so preventing them from being washed away with the liquid can be difficult. The media must be backwashed periodically in order to dislodge materials that plug the media and unduly impede the liquid flow.

In the past, it has been the prevalent practice to provide underdrain systems that include a concrete slab equipped with nozzles having small slits, clay tiles with small holes, or plastic blocks with a permeable cap. Although these types of underdrains can function in a satisfactory manner in many applications, they are not wholly without problems. The need to provide a concrete slab with nozzles results in considerable construction expense, clay tiles often break and plug, while plastic blocks are also expensive.

SUMMARY OF THE INVENTION

The present invention is directed to an improved underdrain system which is constructed to retain the filter media while allowing liquid to pass through the media to the drain and also allowing backwash fluid to be applied for cleaning of the system.

It is the principal object of the invention to provide an underdrain system that functions effectively and yet is less expensive, more reliable and easier to install than prior systems.

In accordance with the invention, filter media particles rest on a pair of perforated plates which are spaced apart by a spacer having a thickness less than the size of the media particles. The spacer defines a gridwork pattern on the plates. Each grid of the upper plate has two perforations which are centered on one diagonal of the grid. The bottom plate has a corresponding underlying grid having two perforations centered on the other diagonal, thus offsetting the bottom perforations from the top perforations. The perforations allow filtered liquid to flow through the plates to an underlying drain, and they also allow backwash fluid to be applied through the drain to clean the media. However, the offset pattern of the perforations in the two plates and the close spacing of the plates prevents the filter media from being washed through the plates along with the filtered liquid.

BRIEF DESCRIPTION OF THE DRAWINGS

In the accompanying drawings which form a part of the specification and are to be read in conjunction therewith and in which like reference numerals are used to indicate like parts in the various views:

FIGS. 4 and 5 depict an underdrain structure which is for the most part constructed in the manner shown in FIGS. 1–3.

DETAILED DESCRIPTION OF THE INVENTION

Figure 2:
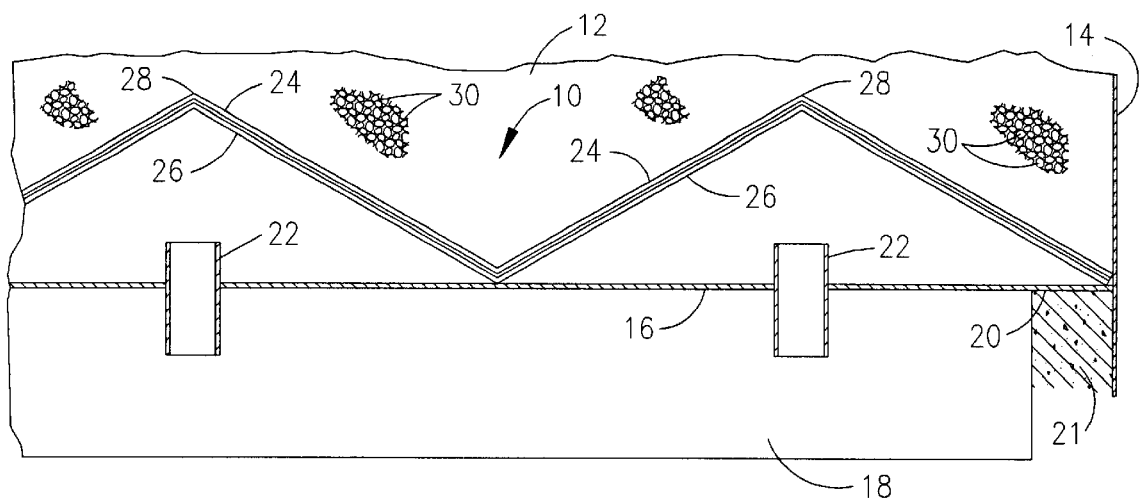
FIG. 2 is a side elevational view of an underdrain system constructed according to the present invention.
Figure 3:
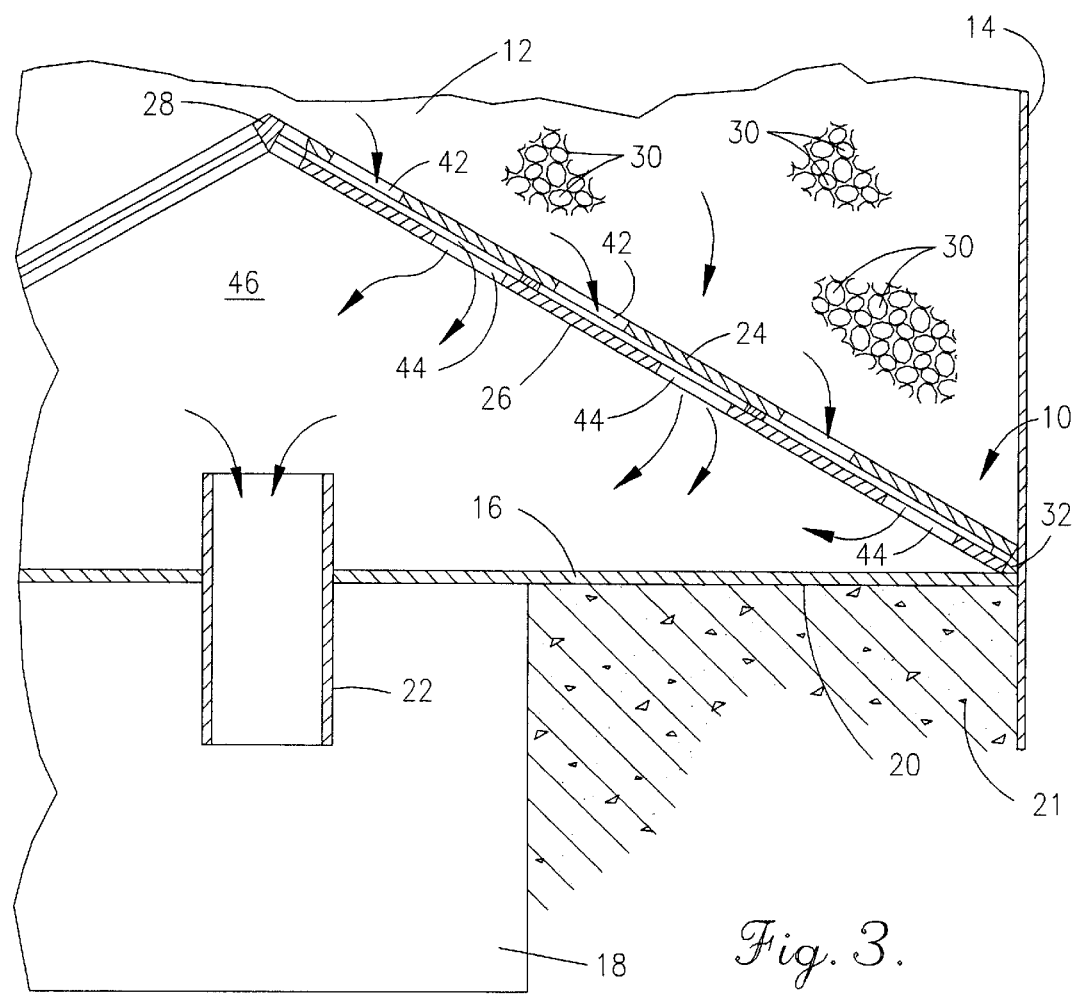
FIG. 3 is a fragmentary sectional view on an enlarged scale showing a portion of the underdrain system of FIG. 2.

With initial reference to FIGS. 2 and 3 in particular, the present invention is directed to an underdrain system which is generally identified by numeral 10 and which is used with a media filter of the type used for the filtering of water, wastewater and other liquids. The underdrain system 10 is preferably provided in modular form, and one of the modules is shown in FIG. 2.

The media filter with which the underdrain system 10 is used includes a filter chamber 12 enclosed within walls 14 which overlie a filter bottom 16 and one or more collection flumes 18 which receive the filtered liquid. The underdrain system 10 is formed by modular laterals having a preselected width (11 inches, for example) and a length substantially equal to the filter bay width. The bottom of each underdrain lateral is formed by a flat, horizontal plate 20 supported on the filter bottom 16. The flumes 18 are positioned on the filter bottom below it and extend perpendicular to the underdrain laterals. The flumes 18 may be formed in concrete 21 which underlies the filter. Drain pipes 22 extend through the underdrain lateral bottom 20 and are open at their top and bottom ends. Each lateral has at least one drain pipe 22. The bottom ends of the pipes 22 open in the flumes 18 to allow the filtered liquid to flow into the flumes.

The underdrain system 10 of the present invention includes a set of upper perforated plates 24 and a set of lower perforated plates 26. The plates 24 and 26 are arranged close together in the filter chamber 12 at inclined angles in an arrangement forming two triangles in cooperation with the lateral bottom 20. The two legs of each triangle which are formed by the panels 24 and 26 meet at an apex 28 which is centered above the underlying drain pipe 22. This triangular arrangement of the plates 24 and 26 provides structural strength to the underdrain structure. It should be noted, however, that the plates can be arranged in other configurations and may be horizontal or curved plates located one above the other, for example.

Above the upper plates 24, the filter chamber 12 contains filter media in the form of a plurality of small media particles 30. By way of example, the particles 30 may be a mixture of fine sand and purified anthracite coal particles. A minimum particle size of approximately 0.020 inch is typical for media that is currently in use. It is to be understood that other media may be employed and that the particles may have a different size.

The media particles 30 rest on top of each of the upper plates 24. As best shown in FIG. 3, the lower ends of the plates 24 and 26 are welded at 32 to one another and to floor 18. At the center of the plate assembly, the ends of the plates 24 and 26 are sealed to one another and to the adjoining plates and the floor 18 by a weld similar to weld 32 or as a continuous bent plate.

The individual plates 24 and 26 are flat, bent or curved plates, and the lower plates 26 are parallel to and spaced closely below the corresponding upper plates 24. A grid at spacers 36 and 38 (see also FIG. 1) are interposed between each set of plates 24 and 26 and are closely sandwiched between the two plates. Each of the spacers 36 and 38 is secured to each of the plates 24 and 26 by any suitable means such as by welding, dimpling or by suitable fasteners. Spacers are placed on a grid at appropriate distances to allow free passage of water between the plates 24 and 26.

The spacers 36 and 38 all have the same thickness, and this thickness should be less than the minimum size of the particles. For example, when the minimum particle size is 0.020 inch, the thickness of each spacer 36 and 38 may be approximately 0.010 inch. Because the plates 24 and 26 are separated by the thickness of the spacers 36 and 38, this arrangement locates the plates 24 and 26 closer together than the minimum size of the media particles 30. Dimples or other means of providing spacing between plates 24 and 26 may also be used.

With reference again to FIG. 1 in particular, the criss-crossing spacers 36 and 38 may take the form of bars arranged in a grid pattern which separates the plates 24 and 26 into a plurality of grid areas 40, each of which is substantially square. A square grid on the lower plate 26 is spaced immediately below and parallel to a corresponding square grid on the upper plate 24. Each grid 40 of each upper plate 24 is provided with a pair of perforations 42 which are centered on one of the diagonal lines D1 of the grid. The two perforations 42 are approximately equidistant from the center of the grid. The underlying grid of the lower plate 26 is provided with a pair of perforations 44 which are offset from perforations 42 and are centered on the other diagonal line D2 of the grid. The perforations 44 are equidistant from the center of the grid and are staggered with respect to the upper plate perforations 42. The perforations 42 and 44 may have any suitable size and shape and are depicted as being round in FIG. 1.

In use, the liquid that is to be filtered is introduced into the top portion of the filter chamber 12 and flows downwardly through the media particles 30 under the influence of gravity, vacuum or pressure. The filter media filters out impurities from the liquid and allows the liquid to filter through the particles to the plates 24 and 26. The liquid is able to flow through the perforations 42 in the upper plate and to flow between the plates and through the perforations 44 in the same grid of the lower plate 26. In this manner, the filtered liquid is able to flow into the area 46 above the filter bottom 16 and beneath the lower plates 26. When the liquid level on floor 18 builds up to the level of the open top end of the drain pipe 22, the liquid flows into the flume 18 through the drain pipe. Thus, the liquid is filtered by the media particles 30 and is able to flow out through the drain pipe 22.

However, the arrangement of the perforations 42 and 44 and the close spacing between the plates 24 and 26 prevents the particles 30 from being carried through the perforated plates along with the liquid. Because of the offset or staggered arrangement of the openings 42 and 44, any material that passes through both openings 42 and 44 must also pass through the space between the plates 24 and 26. This space is smaller than the minimum particle size, so the particles 30 are unable to pass through it and reach the bottom perforations 44. Consequently, the media particles 30 are retained in the filter compartment 12 and are not washed into the drain system along with the filtered liquid.

When the media particles or the perforations become clogged with foreign material, the system can be backwashed by applying backwash fluid under pressure upwardly through the drain pipes 22. The backwash fluid may be liquid, air, or a combination liquid and air. In any event, when it is applied under pressure, it is able to flow upwardly through the lower perforations 44, through the space between the plates 24 and 26, and upwardly through the upper perforations 42 and through the media particles 30. Any material that has become lodged in the filter media can thus be dislodged when the system is being cleaned.

It is thus apparent that the provision of two perforated plates with the perforations staggered and the plates spaced closely together is effective in allowing filtered liquid to pass freely into the area 46 and out through the drain pipes 22. The uniform distribution of the perforations 42 and 44 accommodates a uniform filtering process. When backwash fluid is applied, it is baffled due to the presence of the spacer bars 36 and 38 and is thus distributed evenly throughout the overlying media to minimize areas that are backwashed ineffectively. The construction of the system makes it equally suitable for both liquid and liquid/air backwashing of the filter media particles 30.

Figure 1:
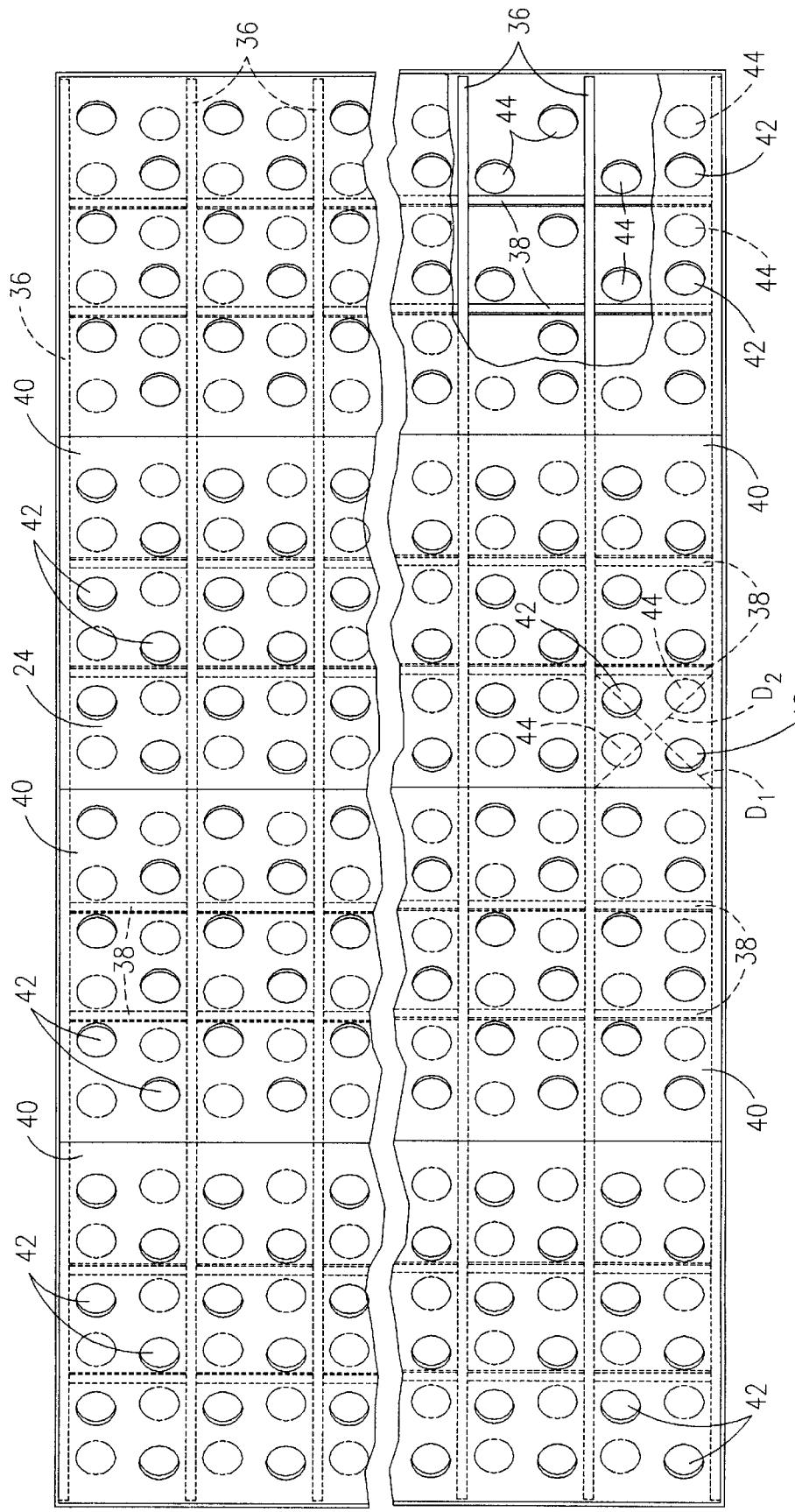
FIG. 1 is a top plan view showing the perforated plates of an underdrain system constructed according to a preferred embodiment of the present invention, with portions broken away for clarity and illustrative purposes.

FIGS. 4 and 5 depict an underdrain structure which is for the most part constructed in the manner shown in FIGS. 1–3. However, the underdrain laterals may be spaced slightly apart as shown in FIG. 5, and a holddown plate 48 may be installed to hold down the laterals. Plate 48 engages the adjacent upper plates 26 and is held down by a stud 50 embedded in the concrete 21 and having a nut 52 threaded onto its top end and tightened against the top of plate 48. Holddown angles 54 engage the upper plates 24 adjacent to the filter walls 14. Threaded studs 56 receive nuts 58 which are tightened down against the angles 54 to hold down the angles and the underdrain laterals.

Additional holddown angles 60 may be secured to engage the apices 28 and thus assist in holding down the underdrain laterals. Angles 60 are secured to the filter walls 14 by bolts 62 and nuts 64.

FIG. 4 depicts a gasket 66 which may be installed around each drain pipe 22. A closure plate 68 extends over the flume 18 and is located immediately below the gasket 66 to hold it in place.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. In a water filter system which includes a discharge drain and a plurality of filter media particles predominantly having a predetermined minimum size, the improvement comprising:

an upper plate having a plurality of perforations therethrough to accommodate liquid flow;

a lower plate having a plurality of perforations therethrough to accommodate liquid flow; and means for mounting said plates between said media particles and said drain with said upper plate spaced above said lower plate a distance less than said predetermined minimum size and with the perforations in said upper plate offset from the perforations in the lower plate to avoid washing of the media particles through said plates.

2. The water filter system as set forth in claim 1, including spacer means interposed between said plates to space said plates apart by a selected distance less than said predetermined minimum size.

3. The water filter system as set forth in claim 2, wherein said spacer means comprises a plurality of spacers sandwiched between said plates and each having a thickness substantially equal to said selected distance.

4. The water filter system as set forth in claim 3, wherein said spacers comprise a plurality of crossing spacer bars arranged in first and second sets each including a plurality of substantially parallel bars, the bars in said first set being substantially perpendicular to the bars in said second set.

5. The water filter system as set forth in claim 4, wherein said bars define a grid pattern which separates said plates into a plurality of grid areas located between adjacent bars in said first and second sets.

6. The water filter system as set forth in claim 5, wherein:
   each of said grid areas is substantially square and defines two perpendicular diagonals;
   each grid area of said upper plate has a pair of said perforations each centered on one of said diagonals; and
   each grid area of said lower plate underlies a corresponding grid of said upper plate and has a pair of said perforations centered on the other diagonal of the grid area.

7. The filter system as set forth in claim 6, wherein said plates are substantially flat plates inclined from horizontal.

8. The filter system as set forth in claim 1, wherein said plates are substantially flat plates inclined from horizontal.

9. In a water filter system which includes a filter compartment holding filter media particles predominantly having a predetermined minimum size and a drain underlying said compartment to drain filtered water, an improved underdrain comprising:
   an upper plate mounted in the filter compartment below the media particles and above the drain, said upper plate having a plurality of perforations arranged in a selected pattern to accommodate flow of liquid through the upper plate; and
   a lower plate mounted in the filter compartment of a location spaced below the upper plate by a distance less than said predetermined minimum size, said lower plate having a plurality of perforations which are offset from the perforations in the upper plate to accommodate flow of filtered liquid through the plates while blocking passage of the media particles through the plates.

10. The water filter system as set forth in claim 9, wherein:
    the filter compartment has a floor; and
    said plates are arranged in two pairs thereof to define a triangular configuration with said floor, each pair of plates having lower ends located adjacent said floor and an apex spaced above the floor.

11. The water filter system as set forth in claim 9, including spacer means interposed between said plates to space said plates apart by a selected distance less than said predetermined minimum size.

12. The water filter system as set forth in claim 11, wherein said spacer means comprises a plurality of spacers sandwiched between said plates and each having a thickness substantially equal to said selected distance.

13. The water filter system as set forth in claim 12, wherein said spacers comprise a plurality of crossing spacer bars arranged in first and second sets each including a plurality of substantially parallel bars, the bars in said first set being substantially perpendicular to the bars in said second set.

14. A water filter system comprising:
    a filter compartment having a drain for discharging filtered water;
    a pair of plates mounted in said compartment above said drain and including an upper plate and a lower plate;
    filter media in said compartment located above said plates and comprising a plurality of media particles predominantly having a predetermined minimum size;
    spacer means for spacing said plates apart by a selected distance less than said predetermined minimum size; and
    a plurality of perforations through each plate, the perforations in said lower plate being offset from the perforations in said upper plate to allow liquid to flow through both plates while blocking passage of the media particles through both plates.

15. The water filter system as set forth in claim 14, wherein said spacer means comprises a plurality of spacers sandwiched between said plates and each having a thickness substantially equal to said selected distance.

16. The water filter system as set forth in claim 15, wherein said spacers comprise a plurality of crossing spacer bars arranged in first and second sets each including a plurality of substantially parallel bars, the bars in said first set being substantially perpendicular to the bars in said second set.

17. The water filter system as set forth in claim 16, wherein said bars define a grid pattern which separates said plates into a plurality of grid areas located between adjacent bars in said first and second sets.

18. The water filter system as set forth in claim 17, wherein:
    each of said grid areas is substantially square and defines two perpendicular diagonals;
    each grid area of said upper plate has a pair of said perforations each centered on one of said diagonals; and
    each grid area of said lower plate underlies a corresponding grid of said upper plate and has a pair of said perforations centered on the other diagonal of the grid area.

19. The water filter system as set forth in claim 14, wherein said plates are substantially flat plates mounted at an angle inclined from horizontal.

* * * * *